W. C. THOMAS.
PLANTER.
APPLICATION FILED JUNE 24, 1910.
990,081.
Patented Apr. 18, 1911.
2 SHEETS—SHEET 1.
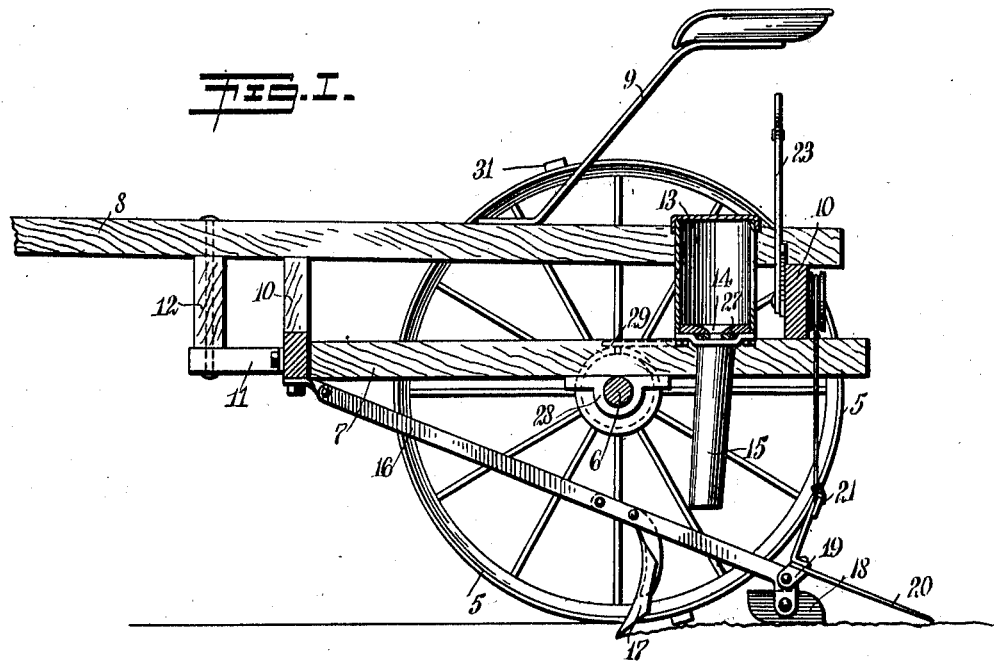
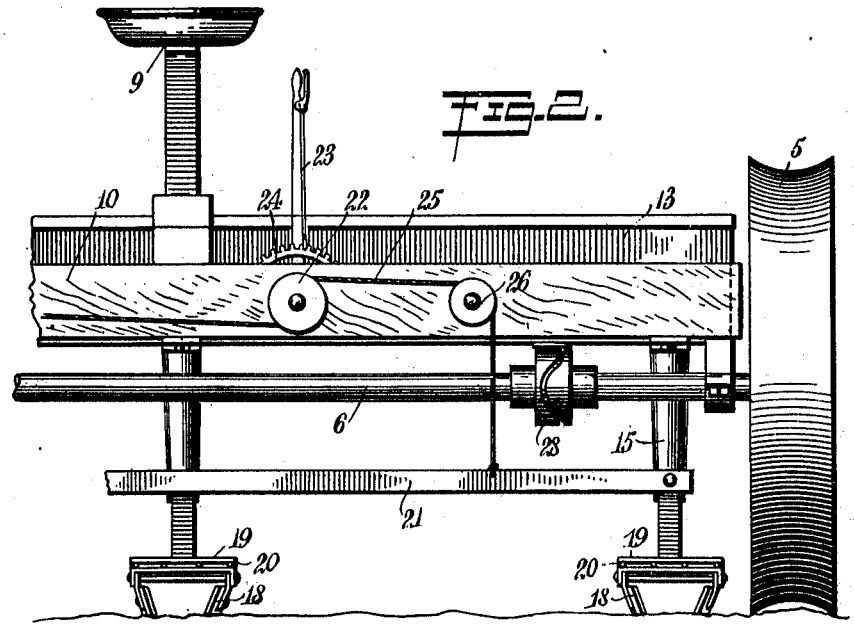
WITNESSES:
G. Robert Thomas
INVENTOR
William C. Thomas
BY Munn & Co
ATTORNEYS

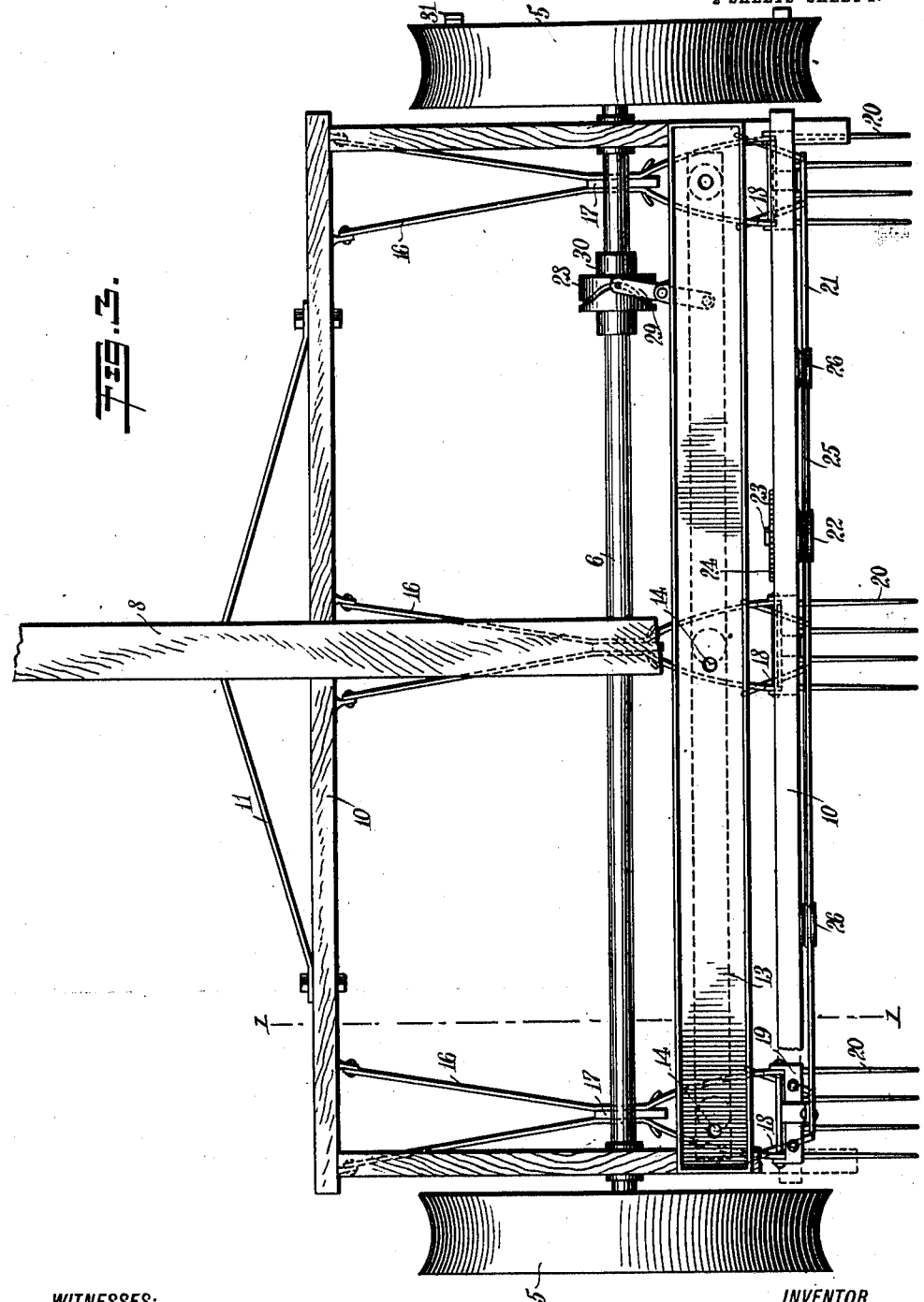

UNITED STATES PATENT OFFICE.

WILLIAM C. THOMAS, OF ODESSA, DELAWARE.

PLANTER.

990,081.  Specification of Letters Patent.  Patented Apr. 18, 1911.

Application filed June 24, 1910. Serial No. 568,692.

*To all whom it may concern:*

Be it known that I, WILLIAM C. THOMAS, a citizen of the United States, and a resident of Odessa, in the county of Newcastle and State of Delaware, have invented a new and Improved Planter, of which the following is a full, clear, and exact description.

The invention is an improvement in corn planters, and has in view a planter adapted to plant one or more rows of hills of corn at a uniform depth at each trip across the field, and to level and pulverize the ground along each row.

The invention further has in view a conveniently operable and relatively simple mechanism for raising the furrow formers and seed coverers from and lowering them to the ground.

Reference is to be had to the accompanying drawings forming a part of this specification, in which similar characters of reference indicate corresponding parts in all the views.

Figure 1 is a longitudinal section through a corn planter constructed in accordance with my invention, the section being taken substantially on the line 1—1 of Fig. 3; Fig. 2 is a fragmentary rear elevation of the same; and Fig. 3 is a plan of the planter.

The planter embodies in its preferred construction a two-wheeled truck having wheels 5, 5, an axle 6, a frame 7, tongue 8 and a driver's seat 9, one of the wheels 5 being fixed to and the other wheel journaled on the axle, with the frame of approximately rectangular form having front and rear cross-sills 10, 10, on which the tongue is seated and secured, the connection of the tongue with the frame being further reinforced by an iron brace 11, attached to the front cross-sill, and extended forwardly at each side of and secured to the tongue through the intermediary of a block 12 arranged at the under side of the tongue.

Immediately in front of the rear cross-sill 10 and transversely arranged is a corn receptacle or hopper 13, which extends substantially the full width of the truck frame, and is provided with a number of feed apertures 14 at the bottom, each leading into a discharge or dropping pipe 15, these apertures and pipes being arranged apart a distance equal to the distances between the corn hills, three of such apertures and pipes being shown in the embodiment of my invention illustrated, the apertures and pipes being arranged respectively at the center and near each end of the hopper.

Pivotally supported from and under the front cross-sill 10 to swing in vertical planes are carrier arms or drag bars 16, each carrier arm extending rearwardly under one of the discharge pipes 15, and, as best shown in Fig. 3, is constructed of two side bars, between which at an intermediate point of the arm is secured a furrow former or cultivator 17, the side bars diverging in each direction from the point of attachment of the furrow former, and at their rear free ends receiving and pivotally supporting a seed coverer 18, each seed coverer having opposed seed covering plates rigidly connected together, the plates inclining downwardly and inwardly, as shown in Fig. 2, and diverging forwardly, as shown in Fig. 3.

To each carrier arm 16, immediately above the seed coverer, is fulcrumed an inverted U-shaped member or yoke 19, to which is rigidly secured a rearwardly-extending fork 20, the yoke of each fork being connected to a transversely-extending cross-bar 21, so that all of the furrow formers, seed coverers and forks will move to and from the ground in unison. For raising and lowering these parts so as to present them in operative and inoperative positions, a drum 22 is shown to be journaled on the outer side of the rear cross-sill 10, and is rigid with a lever 23 traversing a quadrant 24, and accessible from the driver's seat 9, the drum 22 having a line 25 wound thereon so as to wind or unwind both of the end portions of the line simultaneously, the end portions of the line being carried around sheaves 26 respectively arranged at each side of the drum 22, and connected to the cross-bar 21.

A feed bar 27 having feed openings corresponding to the feed openings 14 in the bottom of the hopper, is slidable close to and under the latter over the discharge pipes, and is reciprocated from a cam 28 attached to the axle 6, the connection between the feed bar and the cam being effected by a lever 29 which is fulcrumed intermediate its length and is provided with a pin 30 removably engaging the cam groove. By removing this pin, the feed plate is thrown out of operation and the feeding of the machine stopped.

When the machine is taken to and from the field, the feed bar of the hopper is thrown out of operation and the furrow former, seed coverer and fork elevated above the ground. At the point where the planting is to start, the feed bar is thrown in gear and the furrow formers, seed coverers and forks lowered by shifting the controlling lever 23, this lever being moved so as to permit the furrow formers to pass into the ground the depth it is desired to sow the corn. During each revolution of the wheels the feed bar of the hopper makes two complete reciprocations and accordingly plants six hills of corn, the seed dropping from the discharge pipes immediately at the rear of the furrow formers and in front of the seed coverers, the latter by reason of their particular inclination gathering in the soil as the machine moves forward, and discharging it into the furrows. This soil is afterward leveled and pulverized by the forks 20. If desired, the driving wheel of the machine may be provided with markers 31, to indicate the points of planting.

Having thus described my invention, I claim as new and desire to secure by Letters Patent:

1. In a planter, a truck, a rearwardly-extending carrier arm fulcrumed at its forward end to the truck to swing in a vertical plane, a furrow former and a seed coverer carried by the arm, a rearwardly-extending fork carried by the arm and arranged to track the seed coverer, and a cable to raise and lower the arm, together with the fork and furrow former attached to the fork.

2. In a planter, a truck, a plurality of rearwardly-extending drag bars fulcrumed at their forward ends to the truck to swing in a vertical plane, furrow formers and seed coverers carried by said bars, rearwardly-extending forks fulcrumed to the bars to freely swing in a vertical plane and level and pulverize the soil behind the seed coverer, a cross-bar connecting said drag bars, and hoisting means attached to said cross-bar.

3. In a planter, a truck, a drag bar fulcrumed at its forward end to the truck to swing vertically, a furrow former attached to the drag bar, a seed coverer spaced from and arranged at a substantial distance to the rear of the furrow former, the seed coverer fulcrumed to the drag bar to freely tilt forwardly and rearwardly relatively thereto and independently of the furrow former, and a seed dropper actuated from the truck and having a discharge pipe arranged to discharge the seed directly into the furrow through the space between the former and coverer.

4. In a planter, a frame, a drag bar fulcrumed to said frame, a furrow former suspended from said bar, a seed coverer at the end of said bar, and forks fulcrumed to the end of said bar, adapted to tilt forwardly and rearwardly relatively thereto.

In testimony whereof I have signed my name to this specification in the presence of two subscribing witnesses.

WILLIAM C. THOMAS.

Witnesses:
GEORGE ROEMER,
ALBERT DONOVAN.

Copies of this patent may be obtained for five cents each, by addressing the "Commissioner of Patents, Washington, D. C."